(12) United States Patent
Melis et al.

(10) Patent No.: US 7,848,356 B2
(45) Date of Patent: Dec. 7, 2010

(54) FREQUENCY DOMAIN CHANNEL ESTIMATION IN A SINGLE CARRIER FREQUENCY DIVISION MULTIPLE ACCESS SYSTEM

(75) Inventors: Bruno Melis, Turin (IT); Alfredo Ruscitto, Turin (IT); Pietro Di Paola, Cefalu' (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 12/226,677

(22) PCT Filed: Apr. 27, 2006

(86) PCT No.: PCT/EP2006/003916
§ 371 (c)(1),
(2), (4) Date: Aug. 5, 2009

(87) PCT Pub. No.: WO2007/124761
PCT Pub. Date: Nov. 8, 2007

(65) Prior Publication Data
US 2009/0296585 A1 Dec. 3, 2009

(51) Int. Cl.
*H04J 1/00* (2006.01)
(52) U.S. Cl. .................. 370/480; 370/431; 370/478
(58) Field of Classification Search .......... 370/208, 370/203, 206, 343, 480, 491, 209, 431, 432, 370/436, 437, 478, 464; 375/259, 295, 316, 375/260, 267
See application file for complete search history.

(56) References Cited

U.S. PATENT DOCUMENTS

| | | | |
|---|---|---|---|
| 3,864,632 A | 2/1975 | Chang | |
| 6,765,969 B1 * | 7/2004 | Vook et al. | 375/259 |
| 6,876,645 B1 * | 4/2005 | Guey et al. | 370/342 |
| 7,012,882 B2 * | 3/2006 | Wang et al. | 370/208 |
| 2004/0125235 A1 | 7/2004 | Kim et al. | |
| 2006/0205437 A1 * | 9/2006 | Sung et al. | 455/562.1 |

OTHER PUBLICATIONS

Dinis et al., "A Multiple Access Scheme for the Uplink of Broadband Wireless Systems", IEEE Communications Society, Globecom, pp. 3808-3812, (2004).

(Continued)

*Primary Examiner*—Brenda Pham
(74) *Attorney, Agent, or Firm*—Finnegan, Henderson, Farabow, Garrett & Dunner, L.L.P.

(57) ABSTRACT

A channel estimator for use in a receiver node receiving signals from a plurality of user terminals wherein each user terminal is allotted a respective set of transmission subcarriers and respective test signal sequences for transmission over the channel to be estimated. The channel estimator has stored therein information as to the respective sets of transmission subcarriers allotted to the user terminals for transmission as well as the discrete spectra of the respective test signal sequences allotted to the user terminals. Upon receiving from a plurality of user terminals signals including the respective test signal sequences transmitted over the channel by using the respective sets of transmission subcarriers allotted thereto, the estimator generates the discrete spectrum of the combined test signal received and performs channel estimation as a function of the discrete spectrum of the combined test signal and the discrete spectra of the test signal sequences allotted to the user terminals. A frequency domain channel estimation is performed for a single carrier frequency division multiple access system.

26 Claims, 7 Drawing Sheets

OTHER PUBLICATIONS

Figure 1:
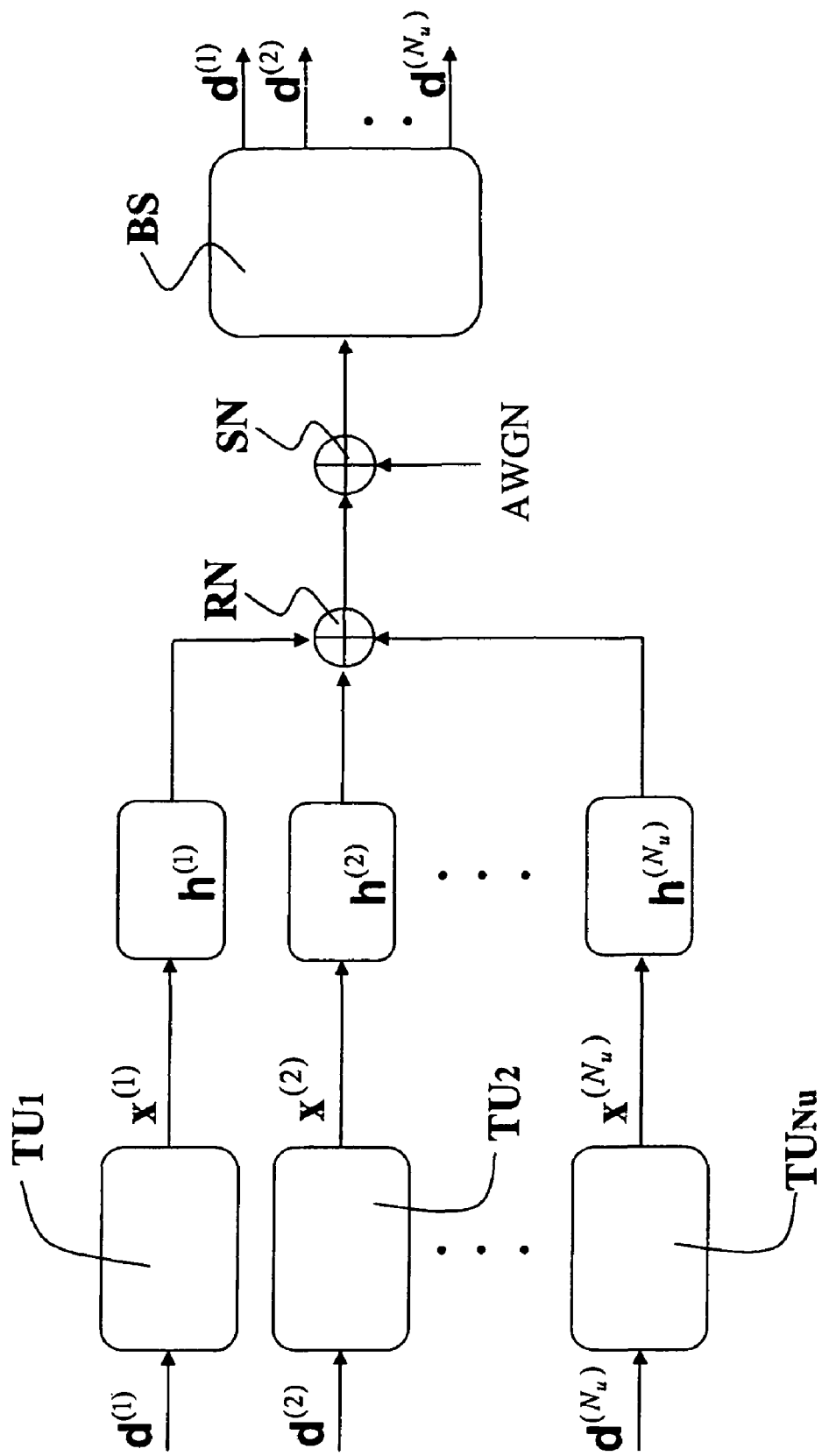

Falconer et al., "Frequency Domain Equalization for Single-Carrier Broadband Wireless Systems", IEEE Communication Magazine, pp. 58-66, (Apr. 2002).

Sorger et al., "Interleaved FDMA—A New Spread-Spectrum Multiple-Access Scheme", IEEE International conference on Communications, No. 1, pp. 1013-1017, (Jun. 1998).

Pun et al., "Joint Synchronization and Channel Estimation in Uplink OFDMA Systems", IEEE, ICASSP, pp. III-857-III-860, (2005).

Yang et al., "Optimal Pilot Design for Multipath Channel Estimation of a Single Carrier Cyclic Prefix-Assisted CDMA System", IEEE, ICCS, pp. 279-283, (2002).

Zhang et al., "Orthogonal Frequency Division Multiple Access Peak-to-Average Power Ratio Reduction Using Optimized Pilot Symbols", Communication Technology Proceedings, IEEE, pp. 574-577, (2000).

* cited by examiner

FREQUENCY DOMAIN CHANNEL ESTIMATION IN A SINGLE CARRIER FREQUENCY DIVISION MULTIPLE ACCESS SYSTEM

CROSS REFERENCE TO RELATED APPLICATION

This application is a national phase application based on PCT/EP2006/003916, filed Apr. 27, 2006, the content of which is incorporated herein by reference.

FIELD OF THE INVENTION

The present invention relates to channel estimation/equalization in telecommunication systems. The invention was developed with special attention paid to its possible use in "uplink" transmission in a system including a plurality of user terminals that transmit signals to a receiver node, wherein each terminal is allotted a respective set of transmission sub-carriers.

DESCRIPTION OF THE RELATED ART

Single-Carrier (SC) transmission combined with FDMA (Frequency Division Multiple Access), or SC-FDMA, is emerging as a key multiple access scheme of future wireless communication systems. For example the SC-FDMA technique is currently considered for the evolution of UMTS (Universal Mobile Telecommunications System), which is usually referred to Evolved UTRA (E-UTRA) or Super 3G (S3G) system.

Single carrier radio access technologies have the advantage of low Peak-to-Average Power Ratio (PAPR). This characteristic is important for reducing power consumption of mobile handsets to a minimum and for maximizing the uplink coverage (from the mobile terminal to the base station), which is mainly limited by the mobile handset transmission power. The SC-FDMA technique allows the users in the cell to transmit simultaneously regardless of their data-rate.

In fact, while designated a "single carrier" technology, this transmission arrangement provides for the various users being made "orthogonal" by being allocated to different frequency sub-bands (sub-carriers) and this characteristic is maintained even in time-dispersive channels. Equalization techniques at the receiver make it possible to reach detection performance levels close to the matched filter bound even in a fully loaded cell and over time-dispersive channels.

Another signal processing scheme that is considered promising for future wireless communication systems is the equalization of the channel response in the frequency domain, denoted in the literature as Frequency Domain Equalization (FDE). The combination of SC-FDMA and frequency domain equalization, leads to performance levels similar to OFDM (Orthogonal Frequency Division Multiplexing), with lower Peak-to-Average Power Ratio (PAPR) and essentially the same overall complexity. A low PAPR in turn means that the power amplifier of an SC transmitter requires a smaller linear range to support a given average power or, in other words, requires less peak power back-off. As such, this approach permits the use of a cheaper power amplifier with respect to a comparable OFDM system: this is a quite significant advantage, since the power amplifier is one of the most expensive components of the User Equipment (UE) transceiver.

Two types of SC-FDMA transmission schemes are currently considered for the application in future broadband wireless systems: namely, "localized SC-FDMA" (LFDMA) and "distributed SC-FDMA (DFDMA)"

In LFDMA, a set of consecutive frequencies in a certain part of the system bandwidth are assigned to each user and different users transmit over non-overlapping frequency bands. Such scheme is suitable for frequency scheduled transmission (where the transmission format of a given user is selected on the basis of the channel characteristics) and it is robust against frequency offsets due to oscillator tolerances, phase noise or Doppler effect. On the other hand the localized method does not exploit the frequency diversity available in a wideband radio channel.

On the contrary, in DFDMA, multiple access is achieved by assigning to the different users orthogonal sub-carriers scattered over the whole system band. DFDMA achieves frequency diversity since the user signal is transmitted over different uncorrelated sub-carriers. However, some strategy has to be adopted to avoid that user orthogonality is lost due to possible frequency offsets.

Both localized and distributed single-carrier signals can be generated in either the time domain or the frequency domain. The time-domain generation of the single-carrier signal is referred in the literature to as Interleaved FDMA (IFDMA). A detailed description of the IFDMA transmission technique is provided in the article of U. Sorger, I. De Broek, M. Schnell, "Interleaved FDMA—A new Spread-Spectrum Multiple-Access Scheme". ICC 1998-IEEE International Conference on Communications, no. 1, June 1998, pp. 1013-1017.

Single-carrier signals can also be generated in the frequency domain. The frequency-domain generation of the single-carrier signal is referred in literature to as DFT Spread OFDM (DFT-SOFDM) or as DFT Precoded OFDM. A detailed description of the DFT-SOFDM technique is provided in the article of R. Dinis, D. Falconer, "A Multiple Access Scheme for the Uplink of Broadband Wireless Systems". IEEE Communications Society, Globecom 2004, pp. 3808-3812.

Time-domain and frequency domain generation of single-carrier signals lead to similar types of signals, so that similar receiver architectures can be used for signal demodulation. A receiver architecture that is particularly attractive due to its low complexity is an SC receiver with Frequency Domain Equalization (SC-FDE).

Frequency domain equalization in a SC system is simply the equivalent in the frequency domain of what is done by a conventional linear time domain equalizer. For channels with severe delay spread, frequency domain equalization is computationally simpler than the corresponding time domain equalization because equalization is performed on a block of data at a time, and operations in this block essentially involve an efficient FFT operation and a channel inversion operation.

Frequency domain equalization can be used both in case of time domain signal generation (e.g. IFDMA transmission) and of frequency domain signal generation (e.g. DFT-SOFDM transmission). The principles of Frequency Domain Equalization are described in D. Falconer, "Frequency Domain Equalization for Single-Carrier Broadband Wireless Systems". IEEE Communication Magazine, April 2002.

Turning specifically to the patent literature, U.S. Pat. No. 3,864,632 discloses a frequency domain equalization system suitable for high-speed synchronous data transmission systems. The samples of the impulse response are transformed by a Discrete Fourier Transform (FFT) device into samples in the frequency domain. Reciprocal values of these frequency domain samples are derived from a reciprocal circuit and then transformed by an inverse discrete Fast Fourier Transform (IFFT) device into time domain samples which are the desired tap gains that are applied to a transversal time domain equalizer in order to minimize the errors in a received signal caused by intersymbol interference and noise.

Conversely, US-A-2004/0125235 illustrates the channel equalizer of a digital television receiver. The channel equalizer comprises a channel estimator, a channel distortion compensator and a noise canceller. The channel estimator estimates the transmission channel impulse response $\hat{h}(\tau)$ in the time domain by using a training signal. The channel distortion compensator comprises two FFT units, a ROM and a frequency domain equalizer. The first FFT unit converts the received signal from the time domain into the frequency domain. The second FFT unit converts the transmission channel impulse response estimated by the channel estimator $\hat{h}(\tau)$ from the time domain to the frequency domain, thus obtaining the channel frequency response $\hat{H}(\omega)$. The ROM memory receives at the input the estimated frequency response of the transmission channel $\hat{H}(\omega)$ from the second FFT and outputs the inverse of the channel frequency response $\hat{H}(\omega)^{-1}$. The frequency domain equalizer uses, as initial equalization coefficients, the frequency response of the inverse channel $\hat{H}(\omega)^{-1}$ output from the ROM memory and adaptively equalizes the channel by using the LMS (Least Mean Squares) algorithm trained by the received data symbols.

OBJECT AND SUMMARY OF THE INVENTION

While per se effective, the prior art approaches described in the foregoing inevitably lead to fairly complex arrangements whenever one contemplates their application to a scenario where channel estimation/equalization involve a plurality of users that are simultaneously active.

The need is therefore felt for arrangements that, by simplifying the channel estimation/equalization process, permit these operations to be performed in a multi-user context without giving rise to arrangements that are very complex and burdensome to implement. All this without penalizing the results obtained in terms of accuracy and reliability.

The object of the invention is thus to provide a satisfactory response to that need.

According to the present invention, that object is achieved by means of a method having the features set forth in the claims that follow. The invention also relates to a corresponding device (i.e. channel estimator/equalizer), as well as a related system and a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is a receiver architecture that performs channel estimation and equalization jointly for all users. Such an architecture is particularly suitable for the application in a base station receiver of a broadband single carrier wireless system: in fact joint channel estimation and equalization lead to a lower system complexity with respect to distributed architectures where these operations are performed separately for each user.

In a particularly preferred embodiment, joint channel estimation and equalization is performed by storing at the receiver (i.e. the base station BS) the inverse (more precisely, the reciprocal) of the discrete spectra of pilot sequences that are transmitted by the different user for estimating the channel. The inverse of the pilot spectrum is pre-calculated and stored in a suitable memory. These values are subsequently used for the estimation of the channel transfer function $\tilde{H}(f)$ of each user and for the channel equalization, using for example an MMSE (Minimum Mean Square Error) technique.

More generally, the arrangement described herein provides channel estimation in a transmission system including a plurality of user terminals for transmitting signals to a receiver node. Each user terminal is allotted a respective set of transmission subcarriers for transmission over the channel as well a respective test signal sequence. Information is stored at the receiving node as to the respective sets of transmission subcarriers allotted to the user terminals and the discrete spectra of said respective test signal sequences allotted to said user terminals. These test signal sequences may thus be included in the signals transmitted by a plurality of user terminals transmitting over the channel, whereby a combined test signal is produced at the receiving node. The discrete spectrum of the combined test signal is generated at the receiving node, and channel estimation is obtained as a function of the discrete spectrum of the combined test signal and the discrete spectra of the respective test signal sequences allotted to the user terminals.

Preferably, channel estimation is obtained as a set of individual contributions, each contribution being a function of a respective portion of the discrete spectrum of the combined test signal and one of the discrete spectra of the respective test signal sequences allotted to the user terminals. Typically, channel estimation includes the operation of dividing the discrete spectrum of the received combined test signal by the discrete spectra of the respective test signal sequences allotted to the user terminals. The operation of dividing just described may be performed by multiplying the discrete spectrum of the combined test signal and the reciprocal of the discrete spectra of the respective test signal sequences, stored at the receiver, allotted to the user terminals.

Identical frequency discretization steps may be used for the discrete spectra of the respective test signal sequences and the discrete spectrum of the combined test signal. In such a case, channel estimation involves point-to-point operations performed on the discrete spectrum of the combined test signal and the discrete spectra of the respective test signal sequences allotted to said the user terminals. If different frequency discretization steps are used for the discrete spectra of the respective test signal sequences and the discrete spectrum of the combined test signal (e.g. frequency discretization steps that are multiple of one another), either of the discrete spectra of the respective test signal sequences and the discrete spectrum of the combined test signal can be subjected to interpolation to obtain identical frequency discretization steps.

BRIEF DESCRIPTION OF THE ANNEXED REPRESENTATIONS

Figure 2:
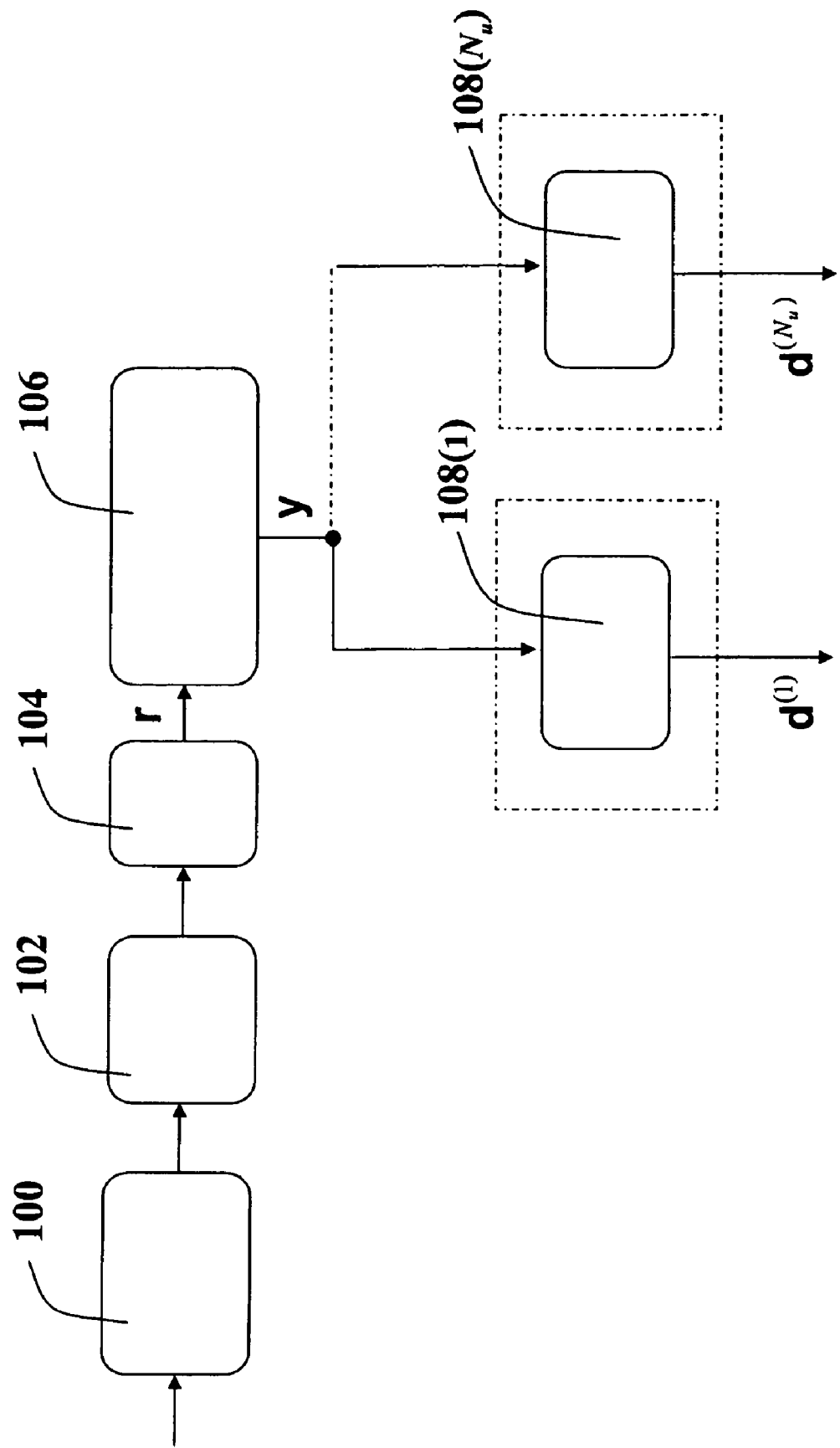
Figure 3:
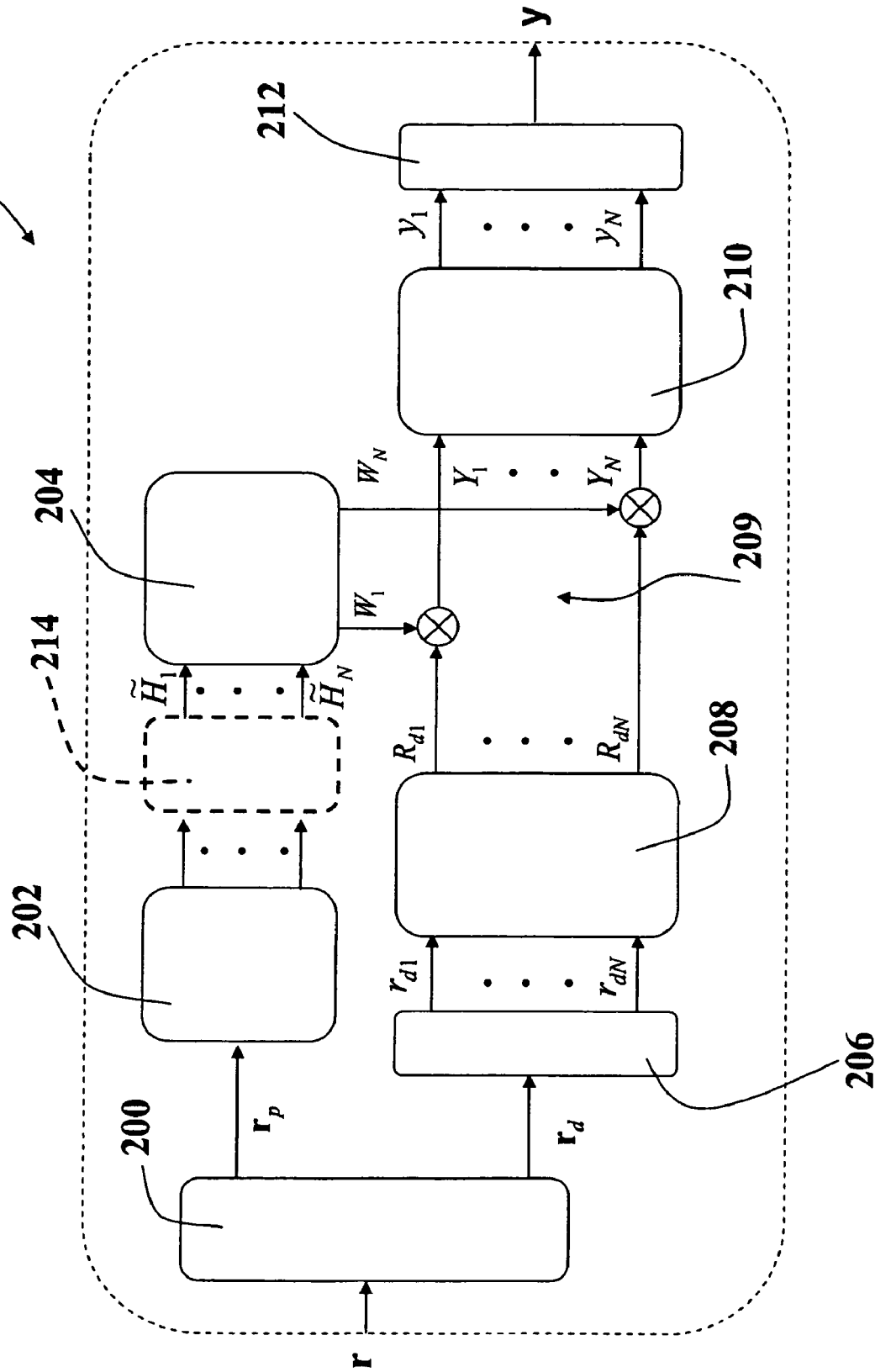
Figure 4:
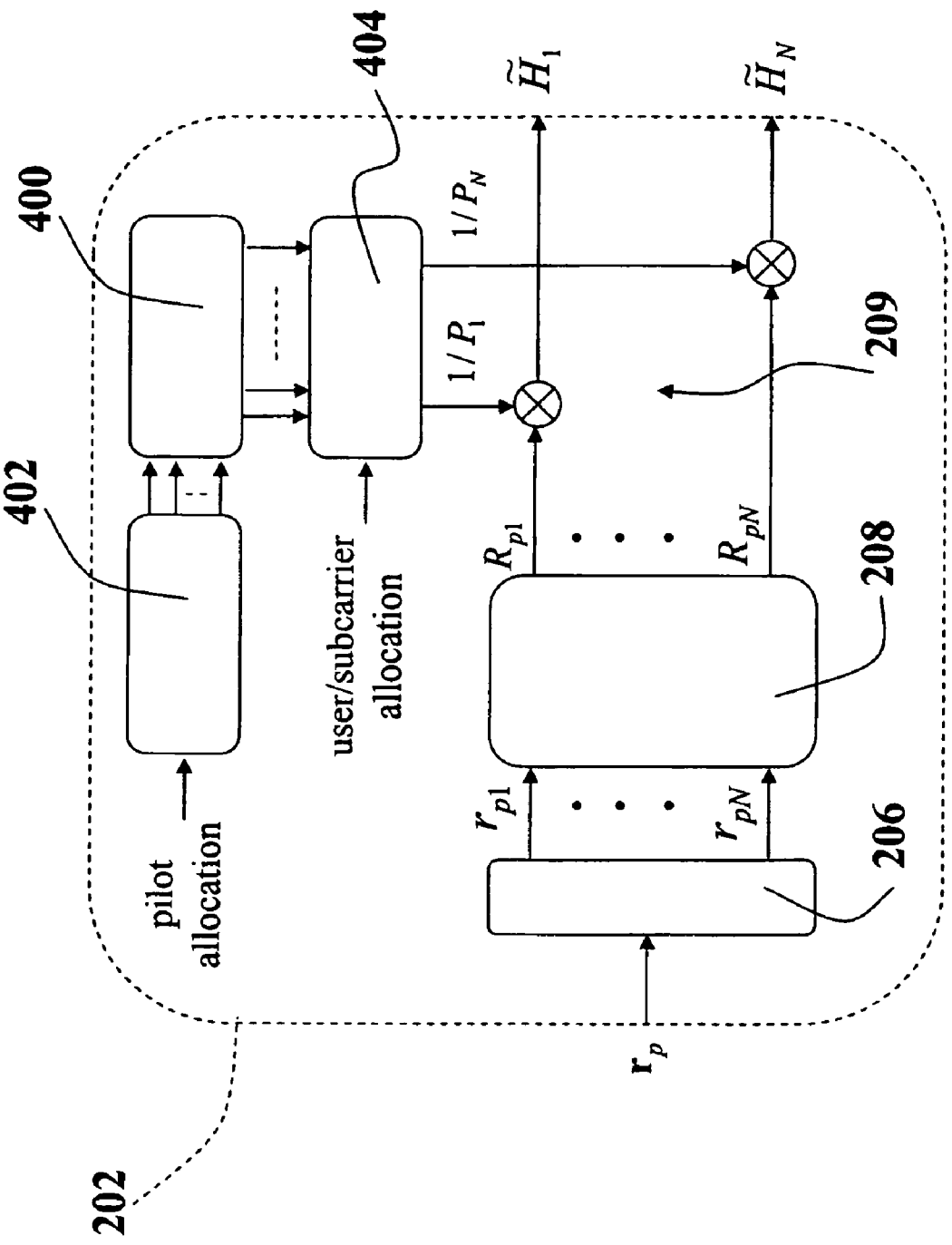
Figure 5:
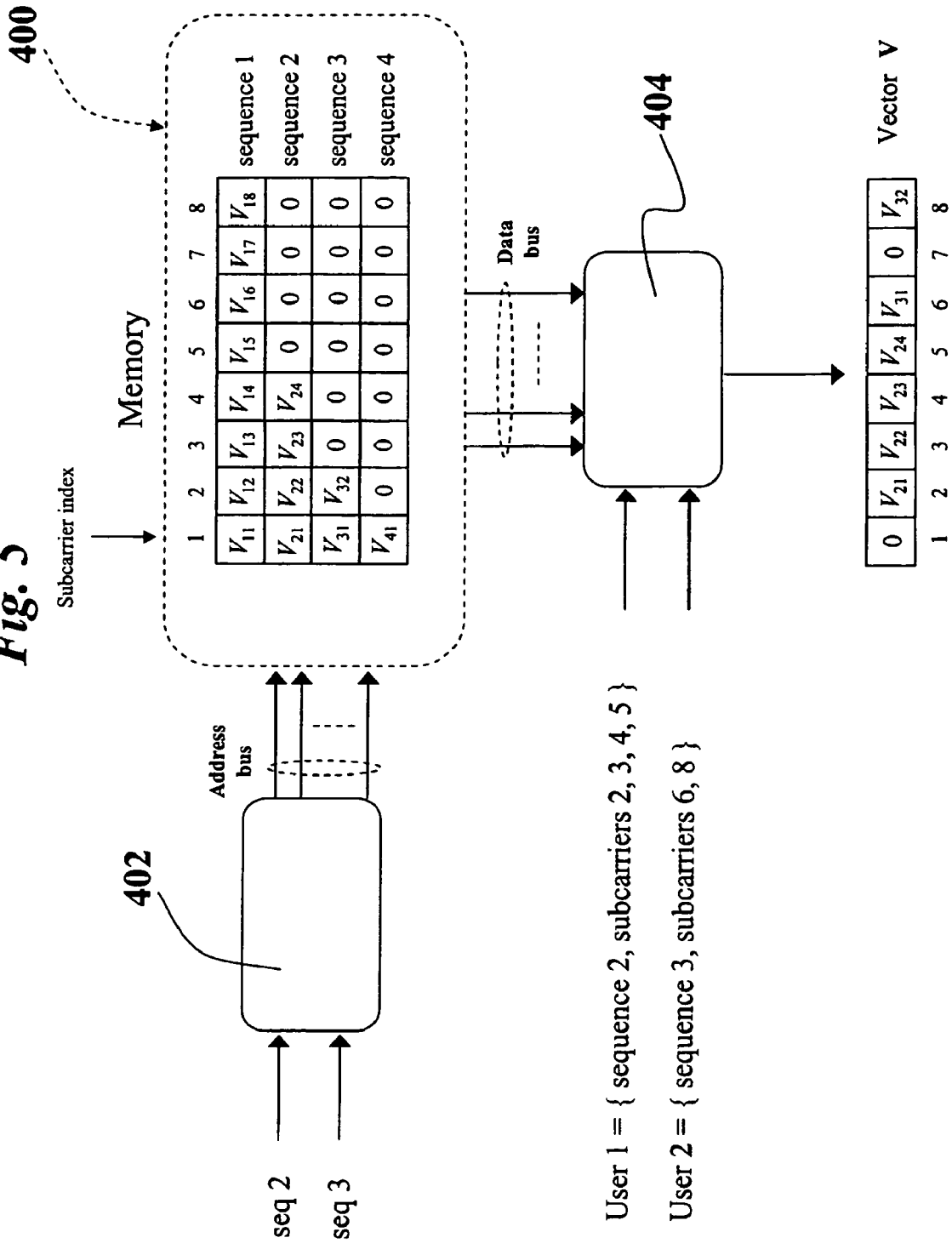
Figure 6:
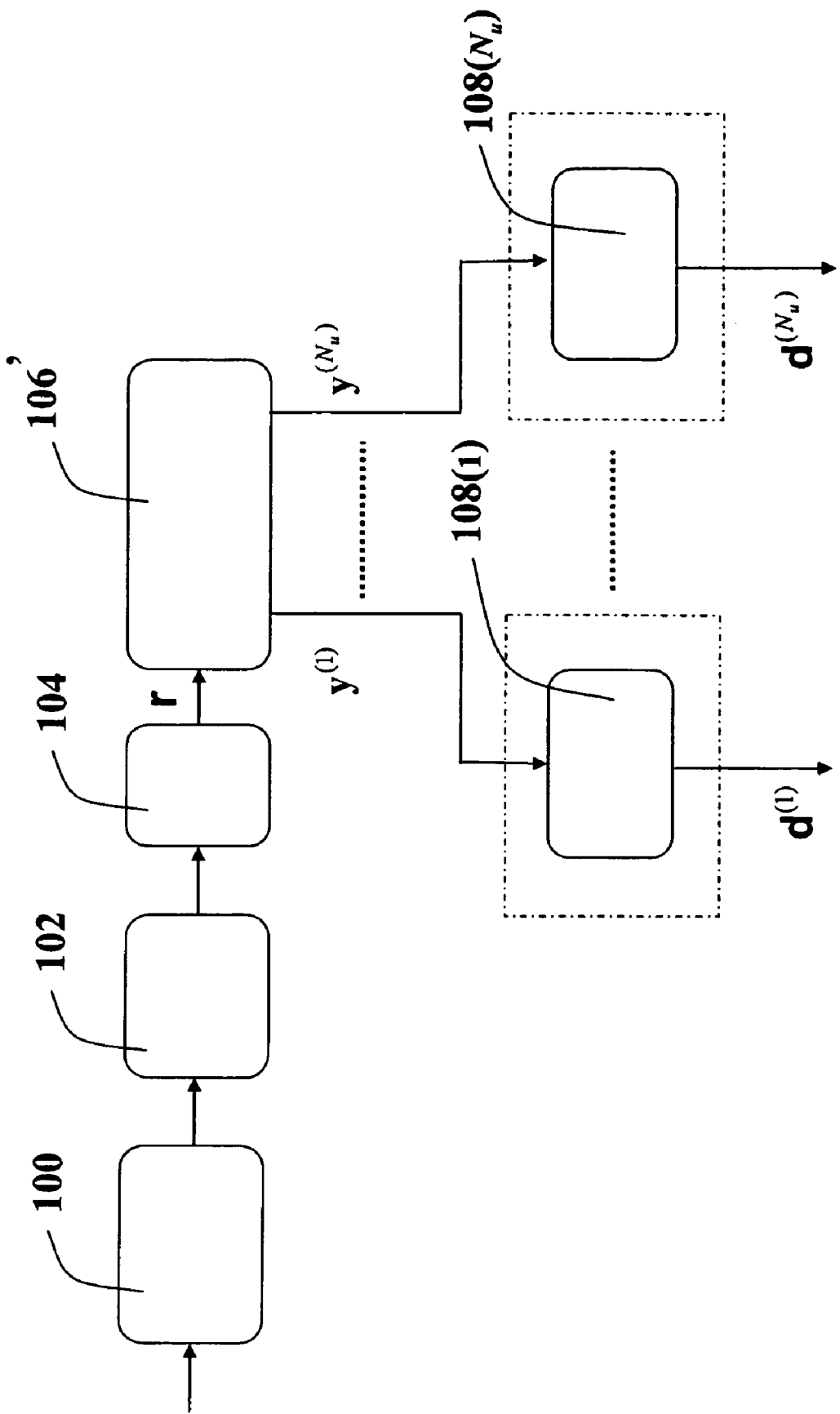
Figure 7:
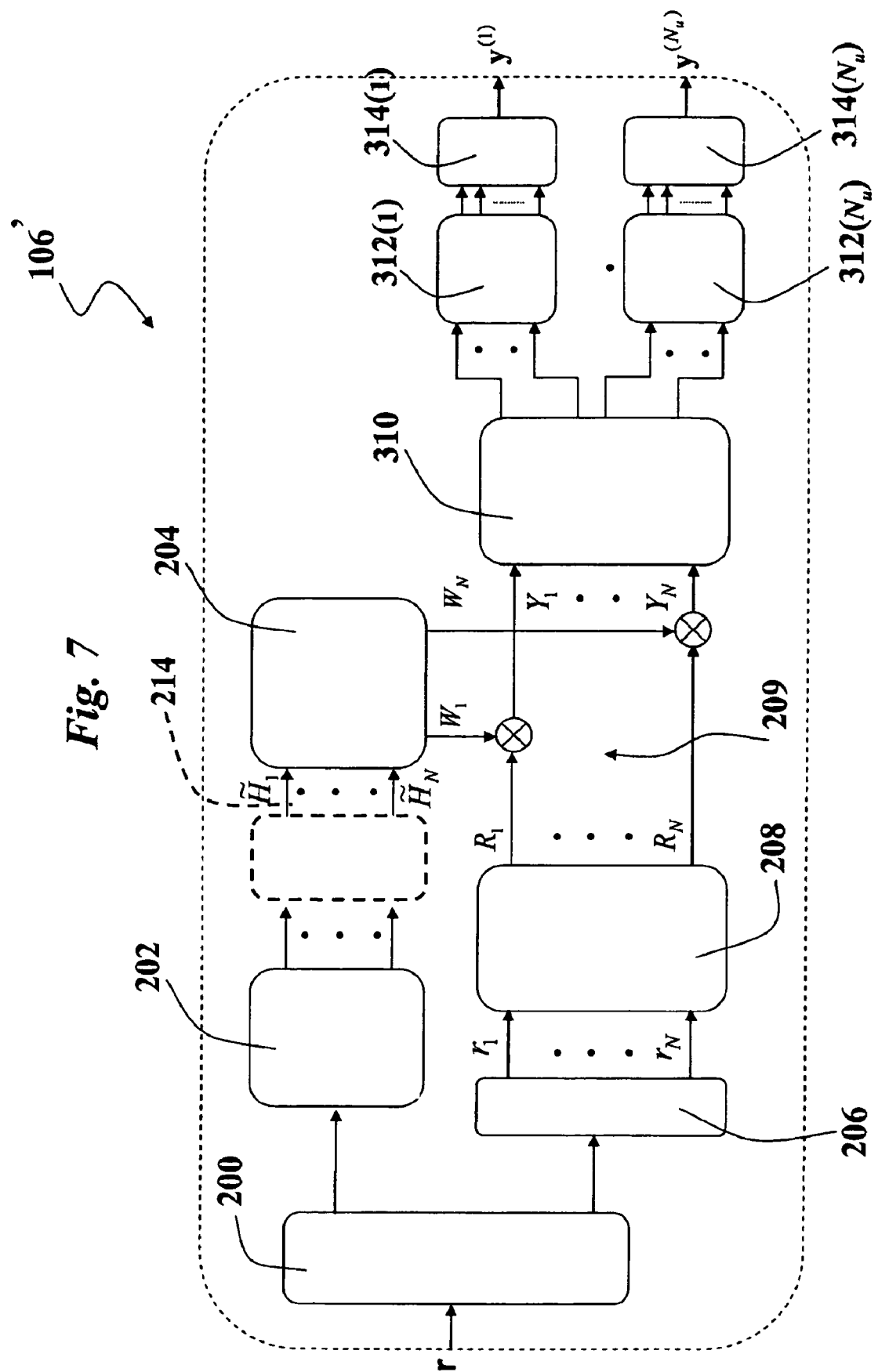

The invention will now be described, by way of example only, with reference to the enclosed figures of drawing, wherein:

FIG. 1 is a block diagram generally representative of the context of use of the arrangement described herein;

FIG. 2 details certain processing features adapted to be introduced in the arrangement described herein;

FIG. 3 is a block diagram of a joint channel estimation and equalization scheme adapted to incorporate the arrangement described herein;

FIG. 4 details the channel estimation feature of the scheme of FIG. 3;

FIG. 5 details operation of the channel estimation feature of FIG. 4;

FIG. 6, which is basically similar to FIG. 2, details certain processing features adapted to be introduced in the arrangement described herein; and FIG. 7 is a block diagram of another joint channel estimation and equalization scheme adapted to incorporate the arrangement described herein.

DETAILED DESCRIPTION OF PREFERRED EMBODIMENTS OF THE INVENTION

The exemplary description provided herein will focus on a scenario where many user terminals $TU_1$, $TU_2$, ..., $TU_{Nu}$ simultaneously transmit respective signals $x(1)$, $x(2)$, ..., $x(Nu)$ to a base station BS as it occurs in the uplink of a mobile communication system exemplified in FIG. 1.

In FIG. 1, the data producing the signals $x(1)$, $x(2)$, ..., $x(Nu)$—which data are expected to be received and recovered at the base station BS are designated $d(1)$, $d(2)$, ..., $d(Nu)$.

Each signal $x(1)$, $x(2)$, ..., $x(Nu)$ is transmitted over a respective channel portion designated $h(1)$, $h(2)$, ..., $h(Nu)$, and—due to transmission being simultaneous—the resulting signals will be added (at a node RN) before being fed to the receiving node, that is the base station BS. All the entities just introduced will be generally assumed to be complex entities including real and imaginary portions. Boldface denotes vector entities.

The noisy nature of the transmission channel(s) is simply modelled by the addition of Gaussian noise (AWGN) at a node SN interposed between the node RN and the base station BS.

Each user transmits a unique carrier signal using the IFDMA or the DFT-SOFDM technique, that is "single carrier" transmission techniques that use a comb-like set of subcarriers. The receiver architecture proposed herein is applicable to both these transmission techniques requiring only some minor modification depending on the considered transmission scheme.

The architecture will now be described of a SC-FDE receiver that has the advantage of reduced complexity with respect to prior art solutions. As indicated, the proposed receiver architecture performs channel estimation and equalization jointly for all users and thus is particularly suitable for the application in a base station receiver of a broadband single carrier wireless system. Joint channel estimation and equalization of the user's signals represents an evident advantage in terms of lower system complexity with respect to distributed architectures where these operations are performed separately for each user.

As described herein, joint channel estimation and equalization is performed by storing at the receiver (i.e. the base station BS) the inverse (more precisely, the reciprocal) of the discrete spectra of pilot sequences that are transmitted by the different user for estimating the channel. The inverse of the pilot spectrum is precalculated and stored in a suitable memory. These values are subsequently used for the estimation of the channel transfer function $\tilde{H}(f)$ of each user and for the channel equalization, using for example an MMSE (Minimum Mean Square Error) technique.

The architecture of a centralized receiver will first be described in the case of an IFDMA transmission. As will be demonstrated in the following, the same receiver architecture can be used with minimal modifications also in case of DFT-SOFDM transmission.

The IFDMA signal is generated in the time domain by compression and block repetition of a PSK or QAM modulated signal and subsequent frequency shift to the desired position in the frequency domain.

The i-th user (that is the i-th user terminal $Tu_i$ in FIG. 1, with $i=1, \ldots N_u$, transmits a block $d^{(i)}=[d_0^{(i)}, d_1^{(i)}, \ldots, d_{Q-1}^{(i)}]$ of Q complex-valued symbols $d_q^{(i)}$, $q=0, \ldots, Q-1$, with each symbol $d_q^{(i)}$ having a time duration $T_S$. These Q symbols are processed in order to build an IFDMA symbol, which represents the minimum block of information transmitted by an IFDMA user.

The generation of an IFDMA symbol is obtained by compressing the duration of each symbol $d_q^{(i)}$ and then performing a block repetition. Hence, the duration of each symbol $d_q^{(i)}$ is reduced from $T_S$ to a lower value $T_C$ equal to $$T_C = \frac{T_S}{L + L_{CP}}$$

where the factor L is related to the useful part of the IFDMA symbol and $L_{CP}$ is related to the cyclic prefix part. After time compression, the block of Q shortened symbols is repeated $L+L_{CP}$ times. Alternatively, the construction of an IFDMA symbol can be described as follows: each of the Q symbols $d_q^{(i)}$ is divided into $L+L_{CP}$ chips, each with time duration $T_C$. The obtained chips are then written by rows in a matrix of dimensions $Q \times (L+L_{CP})$. The matrix is subsequently read out by columns providing the IFDMA symbol of the i-th user. Hence, the IFDMA symbol is composed of $Q \times (L+L_{CP})$ chips. The number of chips in the useful part of the IFDMA symbol is then equal to $$N = Q \cdot L$$

and the total time duration of the IFDMA data symbols including the cyclic prefix is equal to $$T = Q \cdot T_S = Q \cdot (L+L_{CP}) \cdot T_C$$

It is possible to demonstrate that the compression and block repetition produces a periodic signal in the time domain that corresponds to a comb shaped spectrum in the frequency domain. In particular the IFDMA spectrum is composed of Q spectral lines at a distance of $$\Delta f_s = \frac{L + L_{CP}}{Q \cdot T_s}$$

while the total bandwidth of the IFDMA signal is equal to $$B = \frac{1}{T_c} = \frac{L + L_{CP}}{T_S}$$

The IFDMA symbol, generated by compression and block repetition, is then subject to a frequency shift in order to translate the comb shaped spectrum at the desired position in the frequency domain.

A detailed description of the IFDMA symbol generation is provided in the article by U. Sorger, et al. already cited in the introductory portion of the description.

In the following, one will assume that each user transmits a frame composed of K IFDMA symbols, where the first IFDMA symbol is a pilot and the remaining K−1 symbols carry the user data. The pilot carries reference symbols that are known to the receiver and thus can be exploited for the channel estimation and equalization.

In the mathematical description provided hereinafter we consider the general case of pilot and data symbols having the same length N, which is equivalent to say that the transmitted pilot and data symbols are both composed of Q spectral lines in the frequency domain. However, the proposed channel estimation method and the related receiver architecture are applicable also when the pilot and data symbols have different lengths. In such a particular case, the time duration of the pilot symbols is reduced with respect to the time duration of the data symbols in order to minimize the overhead. A shortened pilot symbol is obtained by transmitting $Q_p < Q$ symbols. As a consequence the number of chips in the useful part of the IFDMA pilot symbol is equal to $$N_p = Q_p \cdot L$$

and the total time duration of the IFDMA pilot symbols including the cyclic prefix is equal to $$T_p = Q_p \cdot T_s = Q_p \cdot (L + L_{CP}) \cdot T_C$$

The spectrum of the IFDMA pilot symbol is composed of $Q_p < Q$ spectral lines at a distance of $$\Delta f_s^{(pilot)} = \frac{L + L_{CP}}{Q_p \cdot T_s}$$

while the total bandwidth of the IFDMA pilot symbol is always equal to $$B = \frac{1}{T_c} = \frac{L + L_{CP}}{T_S}$$

In such a case the channel frequency response, estimated on the pilot symbols can be adapted to the different data symbol dimension by using some frequency interpolation method.

The signals of the various users experience different multipath channels each having an impulse response denoted by $h^{(i)}$. Thus, the signal at the receiver end is the sum (node RN of FIG. 1) of $N_u$ user signals corrupted by the intersymbol interference and thermal noise modeled as Additive White Gaussian Noise (AWGN) added at the node SN of FIG. 1.

The architecture of the centralized SC-FDE receiver is illustrated in FIG. 2. The received signal is converted from radiofrequency to baseband in a RF Front End 100 and then filtered by a pulse shaping receiving filter 102. Afterwards, the Cyclic Prefix (CP) is discarded in a block 104 as this is affected by the interference from consecutive IFDMA symbols due to multi-path propagation.

After removal of the Cyclic Prefix in the block 104, the signal r is processed in a block 106 which performs the joint channel estimation and equalization for all the users.

A focal point of the arrangement described herein lies in the structure and operation of the channel estimation and equalization block 106.

Contrary to a distributed receiver architecture, the receiver described herein aims at equalizing directly the signal r which is the sum of the signals received from the different users. Equalization is performed in the frequency domain exploiting the orthogonality properties of the IFDMA or DFT-SOFDM technique. Afterwards the equalized signal is sent to user specific demodulation units 108(1) to 108(Nu) where (baseband) demodulation, integration and data decision are carried out.

Separation of the various user signals is obtained within the user specific demodulation units by exploiting the orthogonality property of the IFDMA technique in the frequency domain.

In the following we denote with $X^{(i)}$ the spectrum of the signal transmitted by the generic user TU(i)

$$X^{(i)} = FFT(x^{(i)}) \quad (1)$$

where FFT(•) is the Fast Fourier Transform of a complex sequence.

As previously explained, the spectrum $X^{(i)}$ of the i-th user is composed by Q spectral lines at the frequencies denoted with $f_q^{(i)}$. The Q spectral lines or sub-carriers are used for the transmission of the data symbols and also for the transmission of the pilot symbols.

In case of transmission over a frequency selective channel with impulse response $h^{(i)} = [h_0^{(i)}, h_1^{(i)}, \ldots, h_M^{(i)}]^T$, the spectral lines of the i-th user at the frequency $f_q^{(i)}$ are modulated by the value of the channel frequency response $H^{(i)} = FFT(h^{(i)})$. The channel frequency response $H^{(i)} = [H_1^{(i)}, H_2^{(i)}, \ldots, H_N^{(i)}]^T$ of the i-th user is a vector with size N=LQ where the j-th element $H_j^{(i)}$ represents the channel response at the j-th subcarrier frequency.

The received signal of the i-th user in the frequency domain can be expressed as the element wise product of $X^{(i)}$ and $H^{(i)}$ $$R^{(i)} = X^{(i)} \cdot H^{(i)} + \Phi \quad (2)$$

where $\Phi$ is an N dimensional vector containing the thermal noise samples in the frequency domain.

If the channel frequency response is known at the receiver for each user, it is possible to compensate the effect of channel simply multiplying the spectrum of the received signal for appropriate equalization coefficients obtained for example with a Minimum Mean Square Error (MMSE) approach. By denoting with $W^{(i)} = [W_1^{(i)}, W_2^{(i)}, \ldots, W_N^{(i)}]^T$ the equalization vector for the i-th user we can write $$W_j^{(i)} = \begin{cases} \dfrac{\tilde{H}_j^{(i)*}}{|\tilde{H}_j^{(i)}|^2 + \eta} & \text{for the } j\text{-th subcarrier of the } i\text{-th user} \\ 0 & \text{otherwise} \end{cases} \quad (3)$$

where $\tilde{H}_j^{(i)}$ is the estimated value of the channel frequency response, at the j-th subcarrier frequency used for transmission by the i-th user. Note that the equalization vector $W^{(i)}$ of the i-th user has only Q values different from zero in correspondence of the frequencies denoted with $f_q^{(i)}$. Finally $\eta$ is the ratio between the thermal noise power spectral density $\sigma_n^2$ and the power spectral density of the transmitted signal $\sigma_x^2$. Hence, the equalized signal for the user i can be expressed as the element wise multiplication of the received signal spectrum $R^{(i)}$ and the equalization vector $W^{(i)}$ $$Y^{(i)} = W^{(i)} \cdot R^{(i)} \quad (4)$$

Since different users exploit respective sets of non-overlapping subcarriers, it is possible to equalize jointly all the users by multiplying the overall received signal for an equivalent equalization vector W $$W = [W_1, W_2, \ldots, W_N]^T \quad (5)$$

where the vector W can be obtained as the sum of the equalization vectors of the different users $$W = \sum_{i=1}^{N_u} W^{(i)} \qquad (6)$$

The operation of joint Channel Estimation and Equalization block 106 of FIG. 2 is illustrated in the block diagram of FIG. 3.

The received complex baseband signal r after cyclic prefix removal (block 104 of FIG. 2) is demultiplexed at 200 in order to separate pilot symbols $r_p$ from data symbols $r_d$. The pilot symbols r p are sent to a block which estimates the channel frequency responses of the $N_u$ users active in the cell. The information on the channel frequency responses of the different multipath channels is exploited in an equalization block 204 to calculate the equivalent equalization vector W. Similarly, the received data symbols $r_d$ are parallelized in a Serial-to-Parallel (S/P) block 206 and converted in a block 208 in the frequency domain by using a Fast Fourier Transform (FFT)

$$R_d = FFT(r_d) \qquad (7)$$

denoting with $r_d = [r_{d1}, r_{d2}, \ldots, r_{dN}]^T$ the received data vector in the time domain and with $R_d = [R_{d1}, R_{d2}, \ldots, R_{dN}]^T$ the correspondent signal in the frequency domain. Each frequency component of the vector $R_d$ is weighted by the corresponding equalization weight, namely the vector $R_d$ is element wise multiplied (see the multiplier stage indicated as a whole as 209) for the equivalent equalization vector W $$Y = W \cdot R_d \qquad (8)$$

where $Y = [Y_1, Y_2, \ldots, Y_N]^T$ is a N-dimensional vector that contains the equalized samples of the received signal. The components of Y are then converted in the time domain in a block 210 by using an IFFT computed over N=LQ points $$y = IFFT(Y) \qquad (9)$$

where $y = [y_1, y_2, \ldots, y_N]^T$ is a vector whose elements are the equalized samples of the received signal from all the users. Finally, the signal vector y is serialized in the Parallel-to-Serial (P/S) block 212 and sent to the user specific demodulation units 108(1) to 108(Nu), as shown in FIG. 2.

As explained above, the equalizer 204 needs the estimates of the channel frequency response $\tilde{H}_j^{(i)}$ of the users transmitting in the cell. The channel estimation is achieved exploiting the IFDMA pilot symbols $x_p$ inserted in the frame and which are known at the receiver.

Such pilot symbols $x_p$ represent respective test signal sequences allotted to the various user terminals ($TU_1$, $TU_2$, ..., $TU_{Nu}$).

In the following it will be generally assumed that these test sequences $x_p$ are transmitted simultaneously by the various user terminals involved. While this represents a preferred embodiment, those of skill in the art will appreciate that simultaneous transmission of the test sequences is not a mandatory requirement for the invention: in fact the receiver (base station BS) may be configured to buffer test sequences received at different times in view of subsequent joint processing.

A block diagram of the channel estimation unit 202 of FIG. 3 is shown in FIG. 4.

Hereinafter we indicate with $x_p^{(i)}$ the IFDMA pilot symbol transmitted by the i-th user and with $x_p$ the sum of the pilot symbols transmitted by all the users in the cell $$x_p = \sum_{i=1}^{N_u} x_p^{(i)} \qquad (10)$$

The pilot sequences transmitted by the different users are orthogonal in the frequency domain, because different users are allocated on different subcarriers.

Let also denote with $P = [P_1, P_2, \ldots, P_N]$ a N-dimensional vector obtained as $$P = FFT(x_p) \qquad (11)$$

The vector P represents the spectrum of $x_p$ and it is composed by N spectral lines as for the IFDMA data symbols. The spectral lines associated to the user i occupy the frequencies $f_q^{(i)}$.

As said before, the base station receiver has the knowledge of the pilot sequences $x_p^{(i)}$ used by the different users active in the cell. Moreover, the receiver also knows the subcarriers that are allocated to each user for the transmission of data and pilots sequences.

In the receiver architecture shown in FIG. 3 the channel estimation is performed in the frequency domain, jointly for all the active users in the cell.

An optional interpolation block 214 is shown in the block diagram of FIG. 3. This block is necessary only in the particular case of shorter pilot symbols having length $N_p < N$. As said before this block allows the adaptation of the channel frequency response, estimated over a grid of $N_p$ frequencies, to the length of the data symbols that conversely are transmitted using a set of N frequencies.

The channel estimation unit described in FIG. 4 includes a memory block having stored therein the reciprocal of the spectra of all the pilot (test) sequences assigned to a given cell. In order to reduce the size of the memory, the reciprocal of the spectrum values is quantized over a suitable number of bits.

The access to the memory 400 is managed by a memory controller 402 that receives as input information the set of pilot sequences used in the cell at a given time instant. With such information, the memory controller 402 addresses the memory and thus fetches the reciprocal of the spectrums corresponding to the used pilot sequences. The values, read from the memory 400, are then provided to a spectrum mapping function 404. The mapping function (or block) receives also as second input the allocation table of the subcarriers among the active users in the cell and, using this information, builds the so-called channel estimation vector V. The vector V is the element-by-element reciprocal of the vector P given by the equation (11)

$$V = [V_1, V_2, \ldots, V_N] = \left[\frac{1}{P_1}, \frac{1}{P_2}, \ldots, \frac{1}{P_N}\right]$$

FIG. 5 provides an example showing the construction of the channel estimation vector V. For simplicity a system with only N=8 subcarriers is considered. The set of pilot sequences usable in the cell is composed by four sequences with different lengths equal to Q=1, 2, 4, and 8. The reciprocal of the spectrum of these four pilot sequences is stored in the memory 400, as shown in FIG. 5. The memory controller 402 receives as input the set of sequences that are currently allocated to the active users in the cell and addresses the memory 400 in order to fetch the required spectrum values. In particular, those sequences numbered 2 and 3 are supposed to be used at the given time instant. The spectrum mapping function 404 receives as input the data stored in the memory 400 and the subcarrier allocations of the different users. In the proposed example the user $TU_1$ is assigned to the pilot sequence 2 and is allocated to the subcarriers {2, 3, 4, 5} by using a localized frequency mapping. The user $TU_2$ is assigned to the pilot sequence 3 and is allocated on the subcarriers {6, 8} using a distributed frequency mapping.

By exploiting this information the mapping block 404 builds the channel estimation vector V by placing the reciprocal of the pilot spectrums in the frequency bins assigned to the different users. The vector V provided by the mapping function is then used to perform the channel estimation as described in the following.

When a new connection is set-up by a user or when a communication ends, the set of pilot sequences used and the subcarrier allocation changes and thus the vector V is updated accordingly.

By referring to the FIG. 4, one will notice that the received pilot symbols $r_p$ are parallelized (at 206) and then converted (at 208) in the frequency domain with a FFT computed over N=LQ points $$R_p = FFT(r_p) \quad (12)$$

where $R_p = [R_{p1}, R_{p2}, \ldots, R_{pN}]^T$ is a vector of length N which contains the frequency samples of the received pilots symbols.

It will be appreciated that this conversion can be achieved exploiting the same circuit which calculates the FFT of the data symbols for the Frequency Domain Equalization (FDE). The vector RP can be expressed as the element-wise product of the transmitted pilot spectrum P and the equivalent channel frequency response vector H $$R_p = P \cdot H + \Phi \quad (13)$$

where $H = [H_1, H_2, \ldots, H_N]$ is obtained by combining the channel frequency responses of the different users $H^{(i)}$. In particular, if the j-th subcarrier is used by the i-th user for transmission, the j-th element of the vector H is equal to $H_j^{(i)}$. The vector $\Phi$ in the equation (13) is an N-dimensional vector containing the thermal noise samples in the frequency domain.

Hence, by using the received pilot symbols it is possible to estimate values of the channel frequency response experienced by the different users. The estimate of the channel frequency response $\tilde{H}$ is obtained by multiplying element wise the received pilot vector $R_p$ for the channel estimation vector V $$\tilde{H} = R_p \cdot V \quad (14)$$

where $\tilde{H} = [\tilde{H}_1, \tilde{H}_2, \ldots, \tilde{H}_N]$. Hence, the elements of $\tilde{H}$ are obtained as $$\tilde{H}_j = R_{pj} \cdot \frac{1}{P_j} = \frac{P_j \cdot H_j + \Phi_j}{P_j} = H_j + \frac{\Phi_j}{P_j} \text{ for } j = 1, 2, \ldots, N \quad (15)$$

Stated otherwise, channel estimation is obtained as a function of the discrete spectrum of the combined test signal produced by the generator 208 and the discrete (pilot) spectra of the respective test signal sequences $x_p$ to the various user terminals $TU_1, TU_2, \ldots, TU_{Nu}$. More specifically, channel estimation is obtained a set of individual, element-wise contributions, each in turn obtained as a function of a respective portion of the discrete spectrum of the combined test signal produced by the generator 208 and the pilot spectrum of the test signal sequences $x_p$ allotted to one of the user terminal $TU_1, TU_2, \ldots, TU_{Nu}$.

As shown, channel estimation involves the operation of dividing the discrete spectrum of the combined test signal by the discrete pilot spectra of the test signal sequences allotted to the user terminals.

From a mathematical point of view, the operation notionally involving the division by each pilot spectrum is preferably performed as the multiplication for the inverse (reciprocal) of the pilot spectrum. This is in turn equivalent to the multiplication by the conjugate of the pilot spectrum followed by the division by the squared modulus as shown below $$\tilde{H}_j = R_{pj} \cdot \frac{1}{P_j} = R_{pj} \cdot \frac{P_j^*}{|P_j|^2}$$

From the equation (15) it follows that the pilot sequence may be chosen in order to obtain a pilot symbol whose frequency spectrum P has a notionally constant magnitude. In fact, if the absolute value $|P_j|$ takes low values for some frequencies, the estimation of the corresponding channel frequency response $\tilde{H}_j$ is unreliable due to the noise enhancement effect. On the other hand the pilot sequence must possibly have constant amplitude so that a low PAPR is achieved.

Considering real antipodal pilot sequences $p = [p_1, p_2, \ldots, p_Q]$ with $p_q \in [+1, -1]$ that have a low PAPR, the set of pilot sequences can be determined with an exhaustive search over $2^Q$ possible antipodal sequences. The suitable sequences are selected by finding the minimum of the metric $\beta$, which ensures the maximum flatness of the pilot power spectrum P $$\beta = \max_j\{|P_j|\} - \min_j\{|P_j|\} \quad (16)$$

$$1 \le j \le N$$

The proposed centralized architecture allows reducing the hardware receiver complexity because the same FFT unit can be exploited both for channel estimation and equalization. Moreover, since the inverse of the vector P elements are stored in a memory, only multiplications between scalars are required. Hence, the computational complexity is mainly due to the FFT and IFFT over N points. The parameters of the system should be selected so that the product N=LQ is a power of two $$L \cdot Q = 2^b \quad (17)$$

If the condition (17) is fulfilled it is possible to implement a radix-2 FFT and IFFT resulting in a lower computational burden.

The block diagrams of FIGS. 6 and 7 illustrate how the receiver architecture of the present invention is applicable also in case of DFT-SOFDM transmission.

The DFT-SOFDM transmitter operates as follows: a size-Q FFT is first applied to the block of Q modulation symbols. This transforms the modulation symbols into the frequency domain. The outputs of the FFT are then mapped to the inputs of an Inverse Fast Fourier Transform (IFFT) with size N>Q, corresponding to the target frequencies. In case of the localized DFT-SOFDM scheme the FFT outputs are mapped on consecutive inputs (i.e. frequencies) of the IFFT block. Conversely, in the distributed scheme the FFT outputs are spread over non adjacent inputs of the IFFT block. The output of the IFFT is then serialized, frequency up-converted and transmitted over the channel.

For both localized and distributed transmission, frequency-domain spectrum shaping may be applied before the signal is transformed back to the time-domain by means of an inverse Fast Fourier transform (IFFT). Similar to time-domain pulse shaping, spectrum shaping can be used to trade-off spectrum efficiency against PAPR.

Also in case of DFT-SOFDM a pilot sequence is transmitted in order to allow the channel estimation at the receiver side. Also in this case we assume that each user transmits a TDMA frame composed of K DFT-SOFDM symbols, where the first symbol is a pilot and the remaining K−1 symbols carry the user data. The pilot carries reference symbols that are known to the receiver and thus can be exploited for the channel estimation and equalization. The pilot sequence can be generated either in the time domain or in the frequency domain. The time domain generation permits to easily find pilot sequences with low PAPR but makes more difficult to obtain the spectrum flatness. On the contrary, the frequency domain generation of the pilot sequences allows to easily achieve the spectrum flatness at the expense of a higher PAPR. In general the set of used pilot sequences should be optimized in order to obtain a good compromise between spectrum flatness and low PAPR.

The following description considers the general case of pilot and data symbols having the same time duration and thus the same size N in the frequency domain. However, in order to reduce the time duration of the pilot symbols, and thus minimize the corresponding overhead, a shorter IFFT size $N_p < N$ can be used for the pilot symbols. In such a case, the spectrum of the pilot symbols is composed of $N_p < N$ subcarriers with larger frequency spacing with respect to the spacing of the N subcarriers that compose the data symbols.

By reducing the IFFT size it is possible to reduce the time duration of the pilot symbols, which is equal to $$T_{pilot} = N_p \cdot t_s + T_S$$

where $t_s$ is the sampling time of the values at the IFFT output in the transmitter and $T_g$ is the cyclic prefix duration. In such a way the pilot overhead is reduced but the channel frequency response is estimated over a lower number of points, thus requiring the application of some interpolation method on the channel estimator outputs.

FIG. 6 shows an exemplary receiver architecture for the DFT-SOFDM technique. This figure appears to be essentially identical to FIG. 2 and in fact the same reference numerals have been used in both figures to designate elements or parts that are identical or equivalent. The basic difference with respect to FIG. 2 (IFDMA transmission) lies in that in the arrangement of FIG. 6 (DFT-SOFDM transmission) the channel estimation and equalization block 106' of FIG. 6 provides $N_u$ separate signals, one for each user.

The block diagram of the joint channel estimation and equalization block 106' is shown in FIG. 7. The channel estimation and equalization operations are the same described in case of IFDMA transmission, so that the previous description is applicable also in this case while the same reference numerals have been used in both figures to designate elements or parts that are identical or equivalent. In the block diagram of FIG. 7 includes an optional interpolation block 214 which is necessary only in the particular case of shorter pilot symbols having length $N_p < N$. The interpolation block 214 allows the adaptation of the channel frequency response, estimated over a grid of $N_p$ frequencies, to the length of the data symbols that conversely are transmitted using a set of N frequencies (e.g. subcarriers).

The basic difference with respect to the architecture of the block 106 in FIG. 3 lies in that the block 106' in FIG. 7 includes a user de-mapping function 310 that operates on the equalized signal $Y = [Y_1, Y_2, \ldots, Y_N]^T$, given by the equation (8). The de-mapping function collects the $Q^{(i)}$ data symbols received in the frequency domain on the $Q^{(i)}$ subcarriers assigned to the i-th user and provides those symbols to a respective one of a plurality of IFFT modules 312(1) to 312 (Nu) of size $Q^{(i)}$. The symbols are converted back to the time domain by the IFFT operation and then provided to user specific demodulation units 314(1) to 314(Nu).

Although the channel estimation, equalization method and receiver architecture of the present invention has been illustrated and described with regard to presently preferred embodiments thereof, it will be understood that, without prejudice to the underlying principles of the invention, the details and the embodiments may vary, even appreciably, with reference to what has been described by way of example only, without departing from the scope of the invention as defined by the annexed claims.

The invention claimed is:

1. A method of channel estimation in a transmission system comprising a plurality of user terminals transmitting signals to a receiver node wherein each said user terminal is allotted a respective set of transmission subcarriers for transmission over a channel, comprising the steps of:

allotting to said user terminals, respective test signal sequences for transmission over said channel;

storing at said receiver node, information as to the respective sets of transmission subcarriers allotted to said user terminals for transmission over said channel as well as discrete spectra of said respective test signal sequences allotted to said user terminals;

including said respective test signal sequences in said signals transmitted over said channel by said plurality of user terminals by using said respective sets of transmission subcarriers allotted thereto, whereby a combined test signal is produced at said receiving node;

generating at said receiving node, a discrete spectrum of said combined test signal; and obtaining channel estimation as a function of said discrete spectrum of said combined test signal and said discrete spectra of said respective test signal sequences allotted to said user terminals.

2. The method of claim 1, comprising the step of obtaining said channel estimation as a set of individual contributions, each contribution of said contributions being obtained as a function of a respective portion of said discrete spectrum of said combined test signal and one of said discrete spectra of said respective test signal sequences allotted to said user terminals.

3. The method of claim 1, comprising the step of obtaining said channel estimation by dividing said discrete spectrum of said combined test signal by said discrete spectra of said respective test signal sequences allotted to said user terminals.

4. The method of claim 3, wherein dividing said discrete spectrum of said combined test signal by said discrete spectra of said respective test signal sequences allotted to said user terminals, is performed by multiplying said discrete spectrum of said combined test signal and a reciprocal of said discrete spectra of said respective test signal sequences allotted to said user terminals.

5. The method of claim 4, comprising the steps of storing at said receiving node, said discrete spectra of said respective test signal sequences allotted to said user terminals in the form of the reciprocal of said discrete spectra.

6. The method of claim 1, comprising the step of using for said discrete spectra of said respective test signal, sequences and said discrete spectrum of said combined test signal, frequency discretization steps that are identical, whereby obtaining said channel estimation comprises point-to-point operations performed on said discrete spectrum of said combined test signal and said discrete spectra of said respective test signal sequences allotted to said user terminals having identical frequency discretization steps.

7. The method of claim 1, comprising the steps of:
using for said discrete spectra of said respective test signal sequences and said discrete spectrum of said combined test signal, frequency discretization steps that are multiples of each other, and
interpolating either of said discrete spectra of said respective test signal sequences and said discrete spectrum of said combined test signal to obtain via interpolation, frequency discretization steps that are identical, whereby obtaining said channel estimation comprises point-to-point operations performed on said discrete spectrum of said combined test signal and said discrete spectra of said respective test signal sequences allotted to said user terminals with said frequency, discretization steps made identical via interpolation.

8. The method of claim 1, comprising the step of selecting said respective test signal sequences as spectra of substantially constant magnitude.

9. The method of claim 1, comprising the step of equalizing said channel at said receiving node by multiplying the received signal by a set of equalization coefficients.

10. The method of claim 4, comprising the step of using a common set of multipliers for multiplying of said discrete spectrum of said combined test signal and said reciprocal of said discrete spectra of said respective test signal sequences, or the step of using a common set of multipliers for equalizing said channel by multiplying the received signal by a set of equalization coefficients.

11. The method of claim 1, wherein said transmission system comprises an interleaved frequency division multiple access transmission system.

12. The method of claim 1, wherein said transmission system comprises a DFT-spread orthogonal frequency division multiplexing transmission system.

13. A channel estimator for channel estimation in a receiver node receiving signals from a plurality of user terminals, wherein each said user terminal is allotted a respective set of transmission subcarriers and respective test signal sequences for transmission over a channel, wherein said channel estimator comprises:
at least one memory having stored therein information as to respective sets of transmission subcarriers allotted to said user terminals for transmission over said channel as well as discrete spectra of said respective test signal sequences allotted to said user terminals;
a spectrum generator for generating a discrete spectrum of a combined test signal produced at said receiving node as a result of receiving from a plurality of said user terminals, signals comprising said respective test signal sequences transmitted over said channel by using said respective sets of transmission subcarriers allotted thereto; and
processing elements for obtaining channel estimation as a function of said discrete spectrum of said combined test signal and said discrete spectra of said respective test signal sequences allotted to said user terminals.

14. The channel estimator of claim 13, wherein said processing elements are configured for obtaining said channel estimation as a set of individual contributions, each contribution being obtained as a function of a respective portion of said discrete spectrum of said combined test signal and one of said discrete spectra of said respective test signal sequences allotted to said user terminals.

15. The channel estimator of claim 13, wherein said processing elements are configured for obtaining said channel estimation by the operation of dividing said discrete spectrum of said combined test signal by said discrete spectra of said respective test signal sequences allotted to said user terminals.

16. The channel estimator of claim 15, wherein said processing elements are configured for dividing said discrete spectrum of said combined test signal by said discrete spectra of said respective test signals allotted to said user terminals, by multiplying said discrete spectrum of said combined test signal and a reciprocal of said discrete spectra of said respective test signal sequences allotted to said user terminals.

17. The channel estimator of claim 16, comprising at least one memory having stored therein said discrete spectra of said respective test signal sequences allotted to said user terminals in the form of the reciprocal of said discrete spectra.

18. The channel estimator of claim 13, wherein said discrete spectra of said respective test signal sequences as stored in said at least one memory and said discrete spectrum of said combined test signal as generated by said spectrum generator have frequency discretization steps that are identical, whereby said processing elements obtain said channel estimation via point-to-point operations performed on said discrete spectrum of said combined test signal and said discrete spectra of said respective test signal sequences allotted to said user terminals with identical frequency discretization steps.

19. The channel estimator of claim 13, wherein:
said discrete spectra of said respective test signal sequences as stored in said at least one memory and said discrete spectrum of said combined test signal as generated by said spectrum generator have frequency discretization steps that are multiples of each other; and
an interpolator is provided for interpolating either of said discrete spectra of said respective test signal sequences and said discrete spectrum of said combined test signal to obtain, via interpolation, frequency discretization steps that are identical, whereby said processing elements obtain said channel estimation via point-to-point operations performed on said discrete spectrum of said combined test signal and said discrete spectra of said respective test signal sequences allotted to said user terminals with said frequency discretization steps made identical via interpolation in said interpolator.

20. The channel estimator of claim 13, wherein the channel estimator has stored therein, discrete spectra of said respective test signal sequences as spectra of substantially constant magnitude.

21. The channel estimator of claim 13, comprising a set of multipliers for equalizing said channel at said receiving node by multiplying the received signal by a set of equalization coefficients.

22. The channel estimator of claim 16, comprising:
a common set of multipliers for dividing said discrete spectrum of said combined test signal by said discrete spectra of said respective test signals allotted to said user terminals, by multiplying said discrete spectrum of said combined test signal and the reciprocal of said discrete spectra of said respective test signal sequences allotted to said user terminals; or a common set of multipliers for equalizing said channel by multiplying the received signal by a set of equalization coefficients.

23. A transmission system comprising the channel estimator of claim 13.

24. The transmission system of claim 23, comprising an interleaved frequency division multiple access transmission system.

25. The transmission system of claim 23, comprising a DFT-spread orthogonal frequency division multiplexing transmission system.

26. A non-transitory computer readable medium encoded with a computer program product, loadable into a memory of at least one computer, the computer program product comprising software code portions for performing the method of claim 1.

* * * * *